(12) United States Patent
Friedlander et al.

(10) Patent No.: US 10,521,434 B2
(45) Date of Patent: *Dec. 31, 2019

(54) POPULATION OF CONTEXT-BASED DATA GRAVITY WELLS

(71) Applicant: International Business Machines Corporation, Armonk, NY (US)

(72) Inventors: Robert R. Friedlander, Southbury, CT (US); James R. Kraemer, Santa Fe, NM (US); David M. Ungar, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 195 days.

This patent is subject to a terminal disclaimer.

(21) Appl. No.: 15/088,221

(22) Filed: Apr. 1, 2016

(65) Prior Publication Data

US 2016/0217185 A1    Jul. 28, 2016

Related U.S. Application Data

(63) Continuation of application No. 13/896,506, filed on May 17, 2013, now Pat. No. 9,348,794.

(51) Int. Cl.
*G06F 7/00* (2006.01)
*G06F 17/30* (2006.01)
(Continued)

(52) U.S. Cl.
CPC ...... *G06F 16/24575* (2019.01); *G06F 16/248* (2019.01); *G06F 16/24573* (2019.01); *G06F 17/10* (2013.01)

(58) Field of Classification Search
USPC ....................................................... 707/752
See application file for complete search history.

(56) References Cited

U.S. PATENT DOCUMENTS 5,450,535 A    9/1995 North
5,664,179 A    9/1997 Tucker
(Continued)

FOREIGN PATENT DOCUMENTS

CN    101866342 A    10/2010
CN    102201043       9/2011
(Continued)

OTHER PUBLICATIONS

U.S. Appl. No. 13/861,058 Non-Final Office Action Mailed April 25, 2016.

(Continued)

*Primary Examiner* — Muluemebet Gurmu
(74) *Attorney, Agent, or Firm* — Law Office of Jim Boice

(57) ABSTRACT

A computer system includes processors that execute instructions stored on storage media to sort data using a data gravity well membrane. When executed, the program instructions: convert raw data into a first logical address that describes metadata about a first payload data; compare the first logical address to a second logical address for a second payload data to derive a Hamming distance between the first and second logical addresses; create a data vector for the second payload data that includes the Hamming distance between the first and second logical addresses; sort data vectors into specific data gravity wells on a data gravity wells membrane according to the Hamming distance stored in the data vector; incorporate a context object and a non-contextual data object into the data vector for the second payload data; and sort the second payload data into specific data gravity wells on the data gravity wells membrane.

8 Claims, 6 Drawing Sheets

(51) Int. Cl.
  *G06F 16/2457* (2019.01)
  *G06F 16/248* (2019.01)
  *G06F 17/10* (2006.01)

(56) References Cited

U.S. PATENT DOCUMENTS

| | | |
|---|---|---|
| 5,689,620 A | 11/1997 | Kopec et al. |
| 5,701,460 A | 12/1997 | Kaplan et al. |
| 5,943,663 A | 8/1999 | Mouradian |
| 5,974,427 A | 10/1999 | Reiter |
| 6,167,405 A | 12/2000 | Rosensteel |
| 6,199,064 B1 | 3/2001 | Schindler |
| 6,269,365 B1 | 7/2001 | Kiyoki et al. |
| 6,275,833 B1 | 8/2001 | Nakamura et al. |
| 6,314,555 B1 | 11/2001 | Ndumu et al. |
| 6,334,156 B1 | 12/2001 | Matsuoka et al. |
| 6,353,818 B1 | 3/2002 | Carino, Jr. |
| 6,381,611 B1 | 4/2002 | Roberge et al. |
| 6,405,162 B1 | 6/2002 | Segond et al. |
| 6,424,969 B1 | 7/2002 | Gruenwald |
| 6,553,371 B2 | 4/2003 | Gutierrez-Rivas et al. |
| 6,633,868 B1 | 10/2003 | Min et al. |
| 6,735,593 B1 | 5/2004 | Williams |
| 6,768,986 B2 | 7/2004 | Cras et al. |
| 6,925,470 B1 | 8/2005 | Sangudi et al. |
| 6,990,480 B1 | 1/2006 | Burt |
| 7,019,740 B2 | 3/2006 | Georgalas |
| 7,047,253 B1 | 5/2006 | Murthy et al. |
| 7,058,628 B1 | 6/2006 | Page |
| 7,103,836 B1 | 9/2006 | Nakamura et al. |
| 7,152,070 B1 | 12/2006 | Musick et al. |
| 7,191,183 B1 | 3/2007 | Goldstein |
| 7,209,923 B1 | 4/2007 | Cooper |
| 7,337,174 B1 | 2/2008 | Craig |
| 7,441,264 B2 | 10/2008 | Himmel et al. |
| 7,477,165 B2 | 1/2009 | Fux |
| 7,493,253 B1 | 2/2009 | Ceusters et al. |
| 7,503,007 B2 | 3/2009 | Goodman et al. |
| 7,523,118 B2 | 4/2009 | Friedlander et al. |
| 7,523,123 B2 | 4/2009 | Yang et al. |
| 7,571,163 B2 | 8/2009 | Trask |
| 7,679,534 B2 | 3/2010 | Kay et al. |
| 7,702,605 B2 | 4/2010 | Friedlander et al. |
| 7,748,036 B2 | 6/2010 | Speirs, III et al. |
| 7,752,154 B2 | 7/2010 | Friedlander et al. |
| 7,778,955 B2 | 8/2010 | Kuji |
| 7,783,586 B2 | 8/2010 | Friedlander et al. |
| 7,788,202 B2 | 8/2010 | Friedlander et al. |
| 7,788,203 B2 | 8/2010 | Friedlander et al. |
| 7,792,774 B2 | 9/2010 | Friedlander et al. |
| 7,792,776 B2 | 9/2010 | Friedlander et al. |
| 7,792,783 B2 | 9/2010 | Friedlander et al. |
| 7,797,319 B2 | 9/2010 | Piedmonte |
| 7,805,390 B2 | 9/2010 | Friedlander et al. |
| 7,805,391 B2 | 9/2010 | Friedlander et al. |
| 7,809,660 B2 | 10/2010 | Friedlander et al. |
| 7,853,611 B2 | 12/2010 | Friedlander et al. |
| 7,870,113 B2 | 1/2011 | Gruenwald |
| 7,877,682 B2 | 1/2011 | Aegerter |
| 7,925,610 B2 | 4/2011 | Elbaz et al. |
| 7,930,262 B2 | 4/2011 | Friedlander et al. |
| 7,940,959 B2 | 5/2011 | Rubenstein |
| 7,953,686 B2 | 5/2011 | Angell et al. |
| 7,970,759 B2 | 6/2011 | Friedlander et al. |
| 7,996,373 B1 | 8/2011 | Zoppas et al. |
| 7,996,393 B1 | 8/2011 | Nanno et al. |
| 8,032,508 B2 | 10/2011 | Martinez et al. |
| 8,046,358 B2 | 10/2011 | Thattil |
| 8,055,603 B2 | 11/2011 | Angell et al. |
| 8,069,188 B2 | 11/2011 | Larson et al. |
| 8,086,614 B2 | 12/2011 | Novy |
| 8,095,726 B1 | 1/2012 | O'Connell et al. |
| 8,145,582 B2 | 3/2012 | Angell et al. |
| 8,150,882 B2 | 4/2012 | Meek et al. |
| 8,155,382 B2 | 4/2012 | Rubenstein |
| 8,161,048 B2 | 4/2012 | Procopiuc et al. |
| 8,199,982 B2 | 6/2012 | Fueyo et al. |
| 8,234,285 B1 | 7/2012 | Cohen |
| 8,250,581 B1 | 8/2012 | Blanding et al. |
| 8,341,626 B1 | 12/2012 | Gardner et al. |
| 8,447,273 B1 | 5/2013 | Friedlander et al. |
| 8,457,355 B2 | 6/2013 | Brown et al. |
| 8,489,641 B1 | 7/2013 | Seefeld et al. |
| 8,620,958 B1 | 12/2013 | Adams et al. |
| 8,799,323 B2 | 8/2014 | Nevin, III |
| 8,849,907 B1 | 9/2014 | Hession et al. |
| 8,983,981 B2 | 3/2015 | Adams et al. |
| 2001/0051881 A1 | 12/2001 | Filler |
| 2002/0091677 A1 | 7/2002 | Sridhar |
| 2002/0111792 A1 | 8/2002 | Cherny |
| 2002/0184401 A1 | 12/2002 | Kadel et al. |
| 2003/0065626 A1 | 4/2003 | Allen |
| 2003/0088576 A1 | 5/2003 | Hattori et al. |
| 2003/0097589 A1 | 5/2003 | Syvanne |
| 2003/0149562 A1 | 8/2003 | Walther |
| 2003/0149934 A1 | 8/2003 | Worden |
| 2003/0212664 A1 | 11/2003 | Breining et al. |
| 2003/0212851 A1 | 11/2003 | Drescher et al. |
| 2004/0036716 A1 | 2/2004 | Jordahl |
| 2004/0111410 A1 | 6/2004 | Burgoon et al. |
| 2004/0153461 A1 | 8/2004 | Brown et al. |
| 2004/0162838 A1 | 8/2004 | Murayama et al. |
| 2004/0249789 A1 | 12/2004 | Kapoor et al. |
| 2005/0050030 A1 | 3/2005 | Gudbjartsson et al. |
| 2005/0086243 A1 | 4/2005 | Abbott et al. |
| 2005/0165866 A1 | 7/2005 | Bohannon et al. |
| 2005/0181350 A1 | 8/2005 | Benja-Athon |
| 2005/0188088 A1 | 8/2005 | Fellenstein et al. |
| 2005/0222890 A1 | 10/2005 | Cheng et al. |
| 2005/0273730 A1 | 12/2005 | Card et al. |
| 2005/0283679 A1 | 12/2005 | Heller et al. |
| 2006/0004851 A1 | 1/2006 | Gold et al. |
| 2006/0036568 A1 | 2/2006 | Moore et al. |
| 2006/0190195 A1 | 8/2006 | Watanabe et al. |
| 2006/0197762 A1 | 9/2006 | Smith et al. |
| 2006/0200253 A1 | 9/2006 | Hoffberg et al. |
| 2006/0256010 A1 | 11/2006 | Tanygin et al. |
| 2006/0271586 A1 | 11/2006 | Federighi et al. |
| 2006/0290697 A1 | 12/2006 | Madden et al. |
| 2007/0006321 A1 | 1/2007 | Bantz et al. |
| 2007/0016614 A1 | 1/2007 | Novy |
| 2007/0038651 A1 | 2/2007 | Bernstein et al. |
| 2007/0067343 A1 | 3/2007 | Mihaila et al. |
| 2007/0073734 A1 | 3/2007 | Doan et al. |
| 2007/0079356 A1 | 4/2007 | Grinstein |
| 2007/0088663 A1 | 4/2007 | Donahue |
| 2007/0130182 A1 | 6/2007 | Forney |
| 2007/0136048 A1 | 6/2007 | Richardson-Bunbury et al. |
| 2007/0174840 A1 | 7/2007 | Sharma et al. |
| 2007/0185850 A1 | 8/2007 | Walters et al. |
| 2007/0239710 A1 | 10/2007 | Jing et al. |
| 2007/0282916 A1 | 12/2007 | Albahari et al. |
| 2007/0300077 A1 | 12/2007 | Mani et al. |
| 2008/0065655 A1 | 3/2008 | Chakravarthy et al. |
| 2008/0066175 A1 | 3/2008 | Dillaway et al. |
| 2008/0086442 A1 | 4/2008 | Dasdan et al. |
| 2008/0091503 A1 | 4/2008 | Schirmer et al. |
| 2008/0133474 A1 | 6/2008 | Hsiao et al. |
| 2008/0147780 A1 | 6/2008 | Trevor et al. |
| 2008/0159317 A1 | 7/2008 | Iselborn et al. |
| 2008/0172715 A1 | 7/2008 | Geiger et al. |
| 2008/0208813 A1 | 8/2008 | Friedlander et al. |
| 2008/0208838 A1 | 8/2008 | Friedlander et al. |
| 2008/0208901 A1 | 8/2008 | Friedlander et al. |
| 2008/0281801 A1 | 11/2008 | Larson et al. |
| 2008/0306926 A1 | 12/2008 | Friedlander et al. |
| 2009/0024553 A1 | 1/2009 | Angell et al. |
| 2009/0064300 A1 | 3/2009 | Bagepalli et al. |
| 2009/0080408 A1 | 3/2009 | Natoli et al. |
| 2009/0125546 A1 | 5/2009 | Iborra et al. |
| 2009/0144609 A1 | 6/2009 | Liang et al. |
| 2009/0164649 A1 | 6/2009 | Kawato |
| 2009/0165110 A1 | 6/2009 | Becker et al. |
| 2009/0177484 A1 | 7/2009 | Davis et al. |

(56) References Cited

U.S. PATENT DOCUMENTS

| | | |
|---|---|---|
| 2009/0182707 A1 | 7/2009 | Kinyon et al. |
| 2009/0287676 A1 | 11/2009 | Dasdan |
| 2009/0299988 A1 | 12/2009 | Hamilton, II et al. |
| 2009/0327632 A1 | 12/2009 | Glaizel et al. |
| 2010/0024036 A1 | 1/2010 | Morozov et al. |
| 2010/0030780 A1 | 2/2010 | Eshghi et al. |
| 2010/0070640 A1 | 3/2010 | Allen et al. |
| 2010/0077033 A1 | 3/2010 | Lowry |
| 2010/0088322 A1 | 4/2010 | Chowdhury et al. |
| 2010/0125604 A1 | 5/2010 | Martinez et al. |
| 2010/0131293 A1 | 5/2010 | Linthicum et al. |
| 2010/0131379 A1 | 5/2010 | Dorais et al. |
| 2010/0169137 A1 | 7/2010 | Jastrebski et al. |
| 2010/0169758 A1 | 7/2010 | Thomsen |
| 2010/0174692 A1 | 7/2010 | Meyer et al. |
| 2010/0179933 A1 | 7/2010 | Bai et al. |
| 2010/0191743 A1 | 7/2010 | Perronnin et al. |
| 2010/0191747 A1 | 7/2010 | Ji et al. |
| 2010/0241644 A1 | 9/2010 | Jackson et al. |
| 2010/0257198 A1 | 10/2010 | Cohen et al. |
| 2010/0268747 A1 | 10/2010 | Kern et al. |
| 2010/0274785 A1 | 10/2010 | Procopiuc et al. |
| 2011/0040724 A1 | 2/2011 | Dircz |
| 2011/0066649 A1 | 3/2011 | Berlyant et al. |
| 2011/0077048 A1 | 3/2011 | Busch |
| 2011/0087678 A1 | 4/2011 | Frieden et al. |
| 2011/0093479 A1 | 4/2011 | Fuchs |
| 2011/0098056 A1 | 4/2011 | Rhoads et al. |
| 2011/0123087 A1 | 5/2011 | Nie et al. |
| 2011/0137882 A1 | 6/2011 | Weerasinghe |
| 2011/0161073 A1 | 6/2011 | Lesher et al. |
| 2011/0194744 A1 | 8/2011 | Wang et al. |
| 2011/0208688 A1 | 8/2011 | Ivanov et al. |
| 2011/0246483 A1 | 10/2011 | Darr et al. |
| 2011/0246498 A1 | 10/2011 | Forster |
| 2011/0252045 A1 | 10/2011 | Garg et al. |
| 2011/0282888 A1 | 11/2011 | Koperski et al. |
| 2011/0299427 A1 | 12/2011 | Chu et al. |
| 2011/0301967 A1 | 12/2011 | Friedlander et al. |
| 2011/0314155 A1 | 12/2011 | Narayanaswamy et al. |
| 2012/0004891 A1 | 1/2012 | Rameau et al. |
| 2012/0005239 A1 | 1/2012 | Nevin, III |
| 2012/0016715 A1 | 1/2012 | Brown et al. |
| 2012/0023141 A1 | 1/2012 | Holster |
| 2012/0072468 A1 | 3/2012 | Anthony et al. |
| 2012/0079493 A1 | 3/2012 | Friedlander et al. |
| 2012/0109640 A1 | 5/2012 | Anisimovich et al. |
| 2012/0110004 A1 | 5/2012 | Meijer |
| 2012/0110016 A1 | 5/2012 | Phillips |
| 2012/0131139 A1 | 5/2012 | Siripurapu et al. |
| 2012/0131468 A1 | 5/2012 | Friedlander et al. |
| 2012/0166373 A1 | 6/2012 | Sweeney et al. |
| 2012/0191704 A1 | 7/2012 | Jones |
| 2012/0209858 A1 | 8/2012 | Lamba et al. |
| 2012/0221439 A1 | 8/2012 | Sundaresan et al. |
| 2012/0233194 A1 | 9/2012 | Ohyu et al. |
| 2012/0239761 A1 | 9/2012 | Linner et al. |
| 2012/0240080 A1 | 9/2012 | O'Malley |
| 2012/0246148 A1 | 9/2012 | Dror |
| 2012/0259841 A1 | 10/2012 | Hsiao et al. |
| 2012/0278897 A1 | 11/2012 | Ang et al. |
| 2012/0281830 A1 | 11/2012 | Stewart et al. |
| 2012/0290950 A1 | 11/2012 | Rapaport et al. |
| 2012/0297278 A1 | 11/2012 | Gattani et al. |
| 2012/0311587 A1 | 12/2012 | Li et al. |
| 2012/0316821 A1 | 12/2012 | Levermore et al. |
| 2012/0330958 A1 | 12/2012 | Xu et al. |
| 2013/0019084 A1 | 1/2013 | Orchard et al. |
| 2013/0031302 A1 | 1/2013 | Byom et al. |
| 2013/0060696 A1 | 3/2013 | Martin et al. |
| 2013/0103389 A1 | 4/2013 | Gattani et al. |
| 2013/0124564 A1 | 5/2013 | Oztekin et al. |
| 2013/0173292 A1 | 7/2013 | Friedlander et al. |
| 2013/0173585 A1 | 7/2013 | Friedlander et al. |
| 2013/0191392 A1 | 7/2013 | Kumar et al. |
| 2013/0238667 A1 | 9/2013 | Carvalho et al. |
| 2013/0246562 A1 | 9/2013 | Chong et al. |
| 2013/0254202 A1 | 9/2013 | Friedlander et al. |
| 2013/0291051 A1 | 10/2013 | Balinsky et al. |
| 2013/0291098 A1 | 10/2013 | Chung et al. |
| 2013/0311473 A1 | 12/2013 | Motta et al. |
| 2013/0326412 A1 | 12/2013 | Treiser |
| 2013/0339379 A1 | 12/2013 | Ferrari et al. |
| 2014/0006411 A1 | 1/2014 | Boldyrev et al. |
| 2014/0012884 A1 | 1/2014 | Bornea et al. |
| 2014/0025702 A1 | 1/2014 | Curtiss et al. |
| 2014/0074833 A1 | 3/2014 | Adams et al. |
| 2014/0074885 A1 | 3/2014 | Adams et al. |
| 2014/0074886 A1 | 3/2014 | Medelyan et al. |
| 2014/0074892 A1 | 3/2014 | Adams et al. |
| 2014/0081939 A1 | 3/2014 | Adams et al. |
| 2014/0098101 A1 | 4/2014 | Friedlander et al. |
| 2014/0172417 A1 | 6/2014 | Monk et al. |
| 2014/0188887 A1 | 7/2014 | Adams et al. |
| 2014/0214865 A1 | 7/2014 | Adams et al. |
| 2014/0214871 A1 | 7/2014 | Adams et al. |
| 2014/0250111 A1 | 9/2014 | Morton et al. |
| 2014/0344718 A1 | 11/2014 | Rapaport et al. |

FOREIGN PATENT DOCUMENTS

| | | |
|---|---|---|
| CN | 102236701 | 11/2011 |
| CN | 102385483 A | 3/2012 |
| EP | 1566752 A2 | 8/2005 |
| EP | 1843259 A2 | 10/2007 |
| WO | 2006086179 A2 | 8/2006 |
| WO | 2007044763 A2 | 4/2007 |

OTHER PUBLICATIONS

Faulkner, Paul, "Common Patterns for Synthetic Events in Websphere Business Events," January 15, 2011, http://www.ibm.com/developerworks/websphere/bpmjournal/1101_faulkner2/1101_faulkner2.html, pp. 1-6.

Evaggelio Pitoura et al, "Context in Databases", University of Ioannina, Greece, 2004, pp. 1-19.

Avinash Kaushik, "End of Dumb Tables in Web Analytics Tools! Hello: Weighted Sort", Sep. 7, 2010, www.kaushik.net, pp. 1-15.

Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.

Visual Paradigm, "DB Visual Architect 4.0 Designer's Guide: Chapter 6—Mapping Object Model to Data Model and Vice Versa", 2007, pp. 6-2-6-26.

Anonymous "Fraud Detection Using Data Analytics in the Banking Industry," ACL Services Ltd., 2010, pp. 1-9 <http://www.acl.com/pdfs/DP_Fraud_detection_BANKING.pdf>.

W. Caid et al., "Context Vector-Based Text Retrieval", Fair Isaac Corporation, Aug. 2003, pp. 1-20.

K. Matterhorn, "How to Share Data Between a Host Computer & Virtual Machine," Ehow, pp. 1-3, <http://www.ehow.com/how_7385388_share-host-computer-virtual-machine.html>, Retrieved Feb. 17, 2013.

U.S. Appl. No. 13/342,305, Friedlander et al.—Specification Filed Jan. 3, 2012.

Richard Saling, "How to Give a Great Presentation! From the HP Learning Center", Jul. 28, 2008, <http://rsaling.wordpress.com/2008/07/28/how-to-give-a-great-presentation/>, pp. 1-28.

A. Birrell et al., "A design for high-performance flash disks." ACM SIGOPS Operating Systems Review 41.2 (2007), pp. 88-93.

N. Saxena et al., "Data remanence effects on memory-based entropy collection for RFID systems", International Journal of Information Security 10.4 (2011), pp. 213-222.

A. Jin, et al., "Biohashing: Two Factor Authentication Featuring Fingerprint Data and Tokenised Random Number,"Pattern Recognition 37, Elsevier Ltd., 2004, pp. 2245-2255.

M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.

(56) References Cited

OTHER PUBLICATIONS

P. Kanerva, "What We Mean When We Say "What's the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.
P. Kanerva, "Hyperdimensional Computing: An Introduction to Computing in Distributed Representation With High-Dimensional Random Vectors", Springer Science+Business Media, LLC, Cogn Comput, 1, 2009, pp. 139-159.
M.J. Flynn, et al., "Sparse Distributed Memory Principles of Operation", Research Institute for Advanced Computer Science, 1989, pp. 1-60.
U.S. Appl. No. 13/342,406—Non-Final Office Action Mailed Sep. 27, 2013.
U.S. Appl. No. 13/610,347—Non-Final Office Action Mailed July 19, 2013.
U.S. Appl. No. 13/610,347—Notice of Allowance Mailed August 19, 2013.
U.S. Appl. No. 13/592,905—Non-Final Office Action Mailed May 8, 2013.
J. Cheng et al., "Context-Aware Object Connection Discovery in Large Graphs", Data Engineering, 2009. ICDE '09. IEEE 25th International Conference on, pp. 856-867.
R. Angles et al., "Survey of Graph Database Models", ACM Computing Surveys, vol. 40, No. 1, Article 1, Feb. 2008, pp. 1-65.
U.S. Appl. No. 13/562,714, Robert R. Friedlander, et al.—Specification and Drawings Filed Jul. 31, 2012.
U.S. Appl. No. 13/648,801 Examiner's Answer Mailed Oct. 1, 2015.
U.S. Appl. No. 13/569,366—Non-Final Office Action mailed Jun. 30, 2015.
U.S. Appl. No. 13/733,052—Non-Final Office Action mailed Sep. 18, 2014.
U.S. Appl. No. 13/861,058—Non-Final Office Action mailed Dec. 11, 2014.
U.S Appl. No. 13/609,710—Final Office Action mailed Jul. 24, 2014.
"Ninth New Collegiate Dictionary", Merriam-Webster Inc., 1991, pp. 77 and 242.
"The American Heritage College Dictionary", Fourth Edition, Houghton Mifflin Company, 2004, pp. 44 and 262.
U.S. Appl. No. 13/680,832—Non-Final Office Action Mailed Apr. 3, 2014.
U.S. Appl. No. 13/628,853—Notice of Allowance Mailed March 4, 2014.
U.S. Appl. No. 13/540,267—Non-Final Office Action Mailed Feb. 4, 2014.
U.S. Appl. No. 13/540,230—Non-Final Office Action Mailed Jan. 30, 2014.
U.S. Appl. No. 13/540,295—Non-Final Office Action Mailed Jan. 30, 2014.
U.S. Appl. No. 13/609,710—Non-Final Office Action Mailed Jan. 27, 2014.
U.S. Appl. No. 13/342,406—Notice of Allowance Mailed Mar. 20, 2014.
U.S. Appl. No. 13/628,853—Non-Final Office Action Mailed Nov. 7, 2013.
U.S. Appl. No. 13/593,905—Notice of Allowance Mailed Oct. 25, 2013.
U.S. Appl. No. 13/595,356—Non-Final Office Action Mailed Apr. 14, 2014.
U.S. Appl. No. 13/755,623—Notice of Allowance Mailed May 27, 2014.
S. Alam et al., "Interoperability of Security-Enabled Internet of Things", Springer, Wireless Personal Communication, 2011, No. 61, pp. 567-586.
U.S. Appl. No. 13/648,801—Non-Final Office Action Mailed Jul. 1, 2014.
U.S. Appl. No. 13/896,461—Specification and Drawings Filed May 17, 2013.
U.S. Appl. No. 13/610,523—Non-Final Office Action mailed Apr. 30, 2015.
U.S. Appl. No. 13/540,267—Non-Final Office Action mailed Jun. 4, 2015.
U.S. Appl. No. 13/609,710—Examiner's Answer mailed Jun. 9, 2015.
U.S. Appl. No. 13/780,779—Non-Final Office Action mailed Apr. 3, 2015.
U.S. Appl. No. 13/896,461—Non-Final Office Action mailed Apr. 21, 2015.
U.S. Appl. No. 13/755,987—Non-Final Office Action mailed Jan. 2, 2015.
G. Begelman et al., "Automated Tag Clustering: Improving Search and Exploration in the TagSpace", Collaborative Tagging Workshop, WWW2006, Edinburgh, Scotland, May 2006, pp. 1-29.
U.S. Appl. No. 131621,931—Non-Final Office Action mailed Jan. 28, 2015.
U.S. Appl. No. 13/732,567—Non-Final Office Action mailed Jan. 30, 2015.
U.S.Appl. No. 141078,135—Notice of Allowance mailed Feb. 24, 2015.
U.S. Appl. No. 13/756,051—Notice of Allowance mailed Feb. 27, 2015.
U.S. Appl. No. 13/732,567—Non-Final Office Action mailed Mar. 26, 2015.
L. Du et al., "A Unified Object-Oriented Toolkit for Discrete Contextual Computer Vision", IEEE, IEEE Colloquium on Pattern Recognition, Feb. 1997, pp. 3/1- 3/5. (Abstract Only).
S. Ceri et al., "Model-Driven Development of Context-Aware Web Applications", ACM, ACM Transactions on Internet Technology, 2007, (Abstract Only).
U.S. Appl. No. 13/648,801—Final Office Action mailed Jan. 13, 2015.
U.S. Appl. No. 13/609,710 Decision on Appeal Mailed Nov. 4, 2016.
U.S. Appl. No. 13/733,066 Examiner's Answer Mailed Dec. 20, 2016.
U.S. Appl. No. 13/861,058 Final Office Action Mailed Dec. 29, 2016.
U.S. Appl. No. 13/648,801 Decision on Appeal Mailed Jan. 18, 2017.
Filippova, Katja and Keith B. Hall, "Improved Video Categorization From Text Metadata and User Comments". Proceedings of the 34th International SCM SIGIR Conference on Research and Development in Information Retrieval. ACM, 2011.
Graham Pryor, "Attitudes and Aspirations in a Diverse World: The Project Store Perspective on Scientific Repositories". Ukoln, University of Bath, Digital Curation Center. The International Journal of Digital Curation, Issue 1, vol. 2, 2007. Nov. 2006.
U.S. Appl. No. 13/896,506 Non-Final Office Action Mailed Oct. 26, 2015.
U.S. Appl. No. 15/223,296 Notice of Allowance dated Jun. 30, 2017.

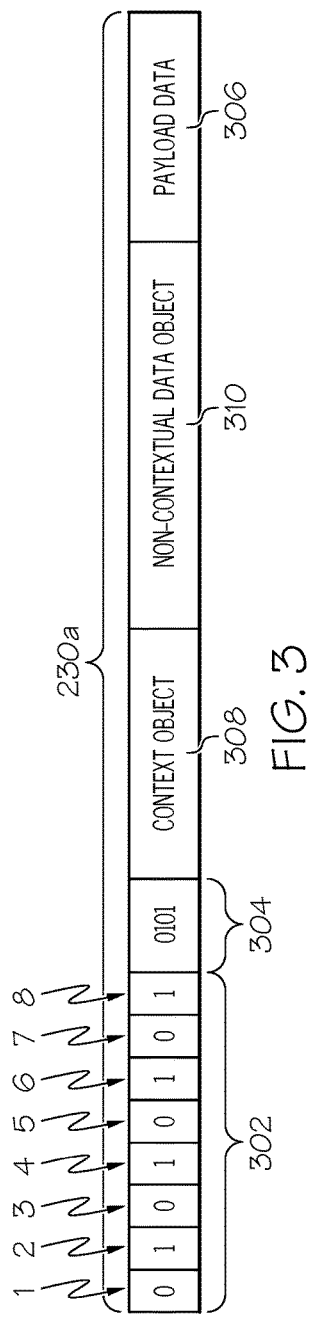
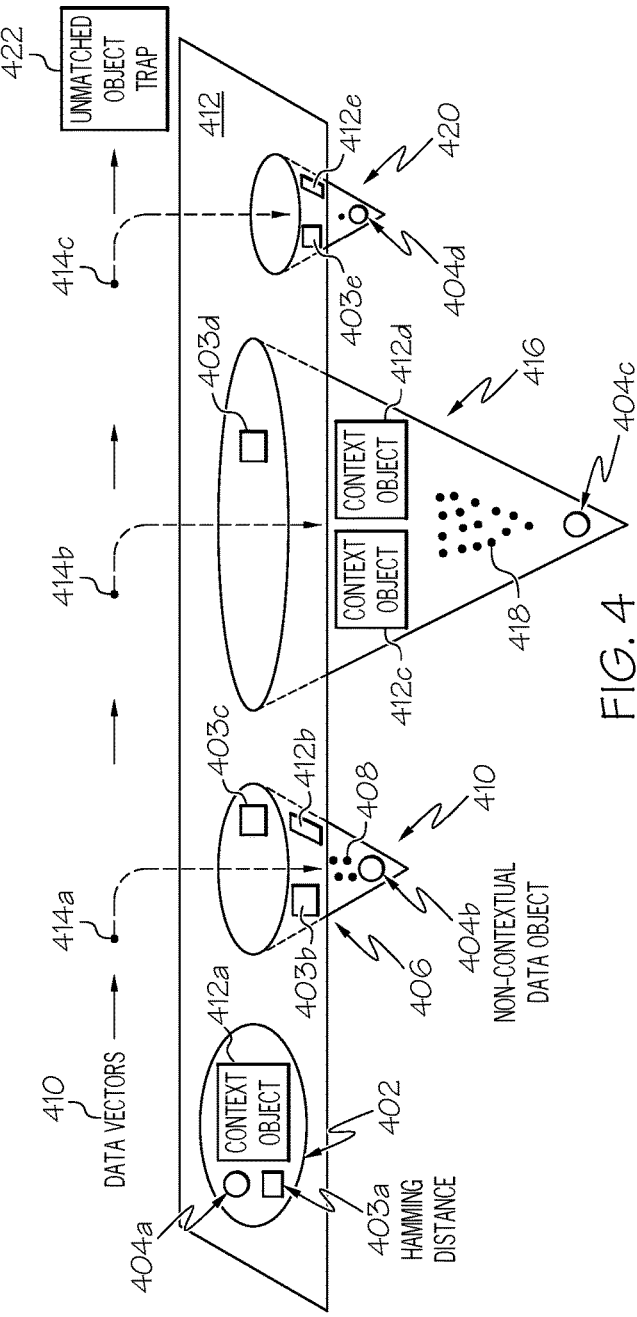

POPULATION OF CONTEXT-BASED DATA GRAVITY WELLS

BACKGROUND

The present disclosure relates to the field of computers, and specifically to the use of computers in managing data. Still more particularly, the present disclosure relates to sorting and categorizing data.

Data are values of variables, which typically belong to a set of items. Examples of data include numbers and characters, which may describe a quantity or quality of a subject. Other data can be processed to generate a picture or other depiction of the subject. Data management is the development and execution of architectures, policies, practices and procedures that manage the data lifecycle needs of an enterprise. Examples of data management include storing data in a manner that allows for efficient future data retrieval of the stored data.

SUMMARY

A computer system includes one or more processors, one or more computer readable memories, one or more computer readable storage mediums, and program instructions stored on at least one of the one or more storage mediums for execution by at least one of the one or more processors via at least one of the one or more memories. The stored program instructions include, but are not limited to: program instructions to convert raw data into a first logical address and first payload data, wherein the first logical address describes metadata about the first payload data; program instructions to compare the first logical address to a second logical address to derive a Hamming distance between the first and second logical addresses, wherein the second logical address is for a second payload data; program instructions to create a data vector for the second payload data, wherein the data vector comprises the Hamming distance between the first and second logical addresses; program instructions to sort data vectors into specific data gravity wells on a data gravity wells membrane according to the Hamming distance stored in the data vector, wherein the data gravity wells membrane is a mathematical framework that 1) performs to provide a virtual environment in which multiple context-based data gravity wells exist; 2) populates the multiple context-based data gravity wells with synthetic context-based objects; and 3) performs to display the multiple context-based data gravity wells on a display; program instructions to apply a context object to a non-contextual data object, wherein the non-contextual data object is a component of the raw data, wherein the non-contextual data object ambiguously relates to multiple subject-matters, and wherein the context object provides a context that identifies a specific subject-matter, from the multiple subject-matters, of the non-contextual data object; program instructions to incorporate the context object and the non-contextual data object into the data vector for the second payload data; and program instructions to sort the second payload data into specific data gravity wells on the data gravity wells membrane according to the context objects and the non-contextual data objects.

BRIEF DESCRIPTION OF THE DRAWINGS

FIG. 3 depicts an exemplary logical address vector that includes its Hamming distance to a predetermined base logical address;

FIG. 4 depicts parsed synthetic context-based objects being selectively pulled into context-based data gravity well frameworks in order to define context-based data gravity wells based on Hamming distances, context objects, and/or non-contextual data objects;

DETAILED DESCRIPTION

Figure 1:
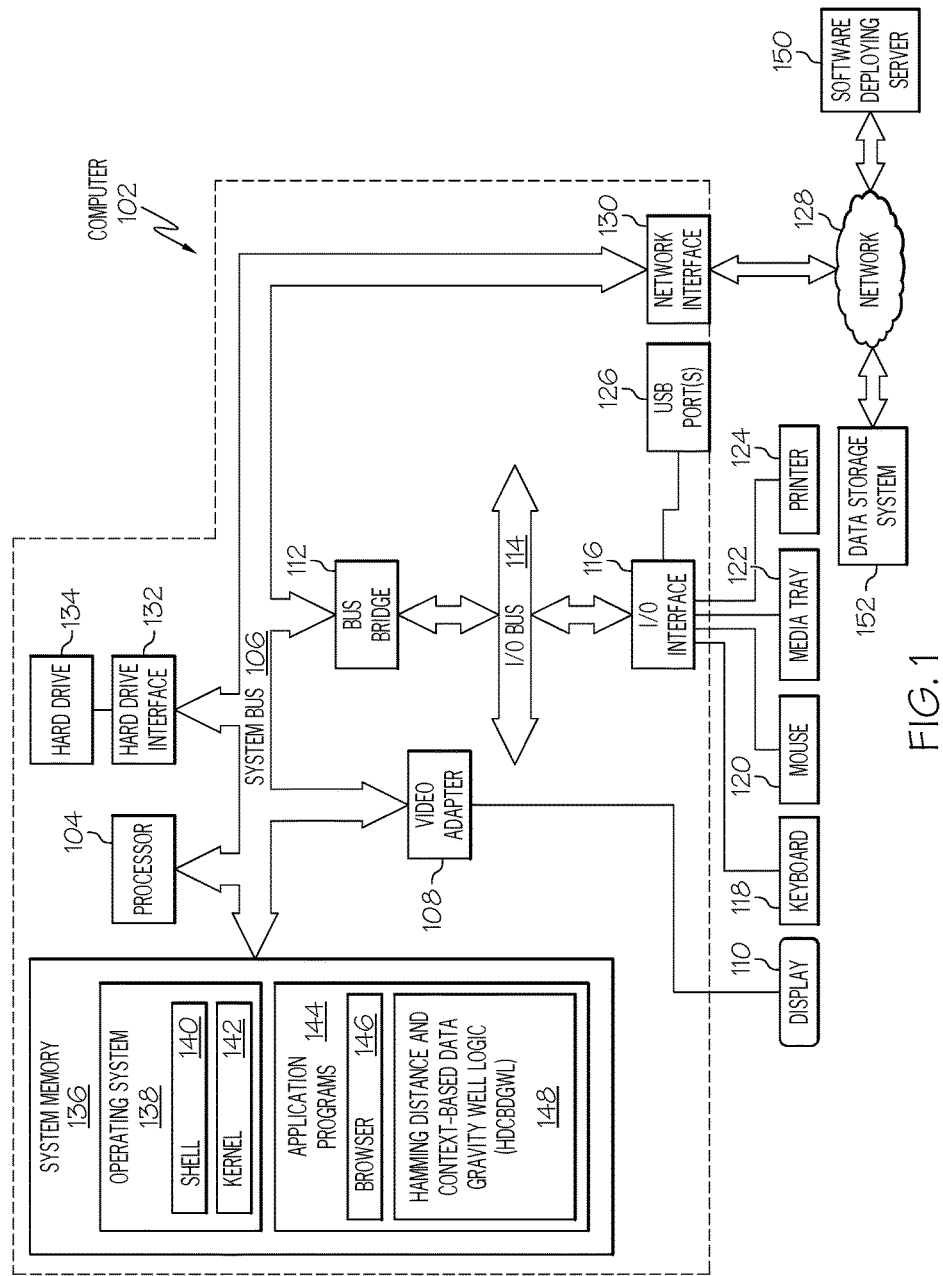
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

In one embodiment, instructions are stored on a computer readable storage device (e.g., a CD-ROM), which does not include propagation media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or data storage system 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Hamming distance and context-based data gravity well logic (HDCBDGWL) 148. HDCB- DGWL 148 includes code for implementing the processes described below, including those described in FIGS. 2-7, and/or for creating the data gravity wells, membranes, etc. that are depicted in FIG. 4. In one embodiment, computer 102 is able to download HDCBDGWL 148 from software deploying server 150, including in an on-demand basis, wherein the code in HDCBDGWL 148 is not downloaded until needed for execution. Note further that, in one embodiment of the present invention, software deploying server 150 performs all of the functions associated with the present invention (including execution of HDCBDGWL 148), thus freeing computer 102 from having to use its own internal computing resources to execute HDCBDGWL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

In one embodiment, the present invention sorts and stores data according to the Hamming distance from one data vector's address to another data vector's address. That is, as described in further detail below, two data units are stored at two different data addresses. These data addresses are hashed to provide description information about the data stored at a particular location. Each data address is made up of ones and zeros at bit locations in the data address. The total difference between these bits, at their particular locations, is known as a "Hamming distance". For example "0100" and "0111" are separated by a Hamming distance of "2", since the penultimate and last bits are different, while "0100" and "1100" are separated by a Hamming distance of "1", since only the first bit is different when "0100" and "1100" are compared to one another.

Figure 2:
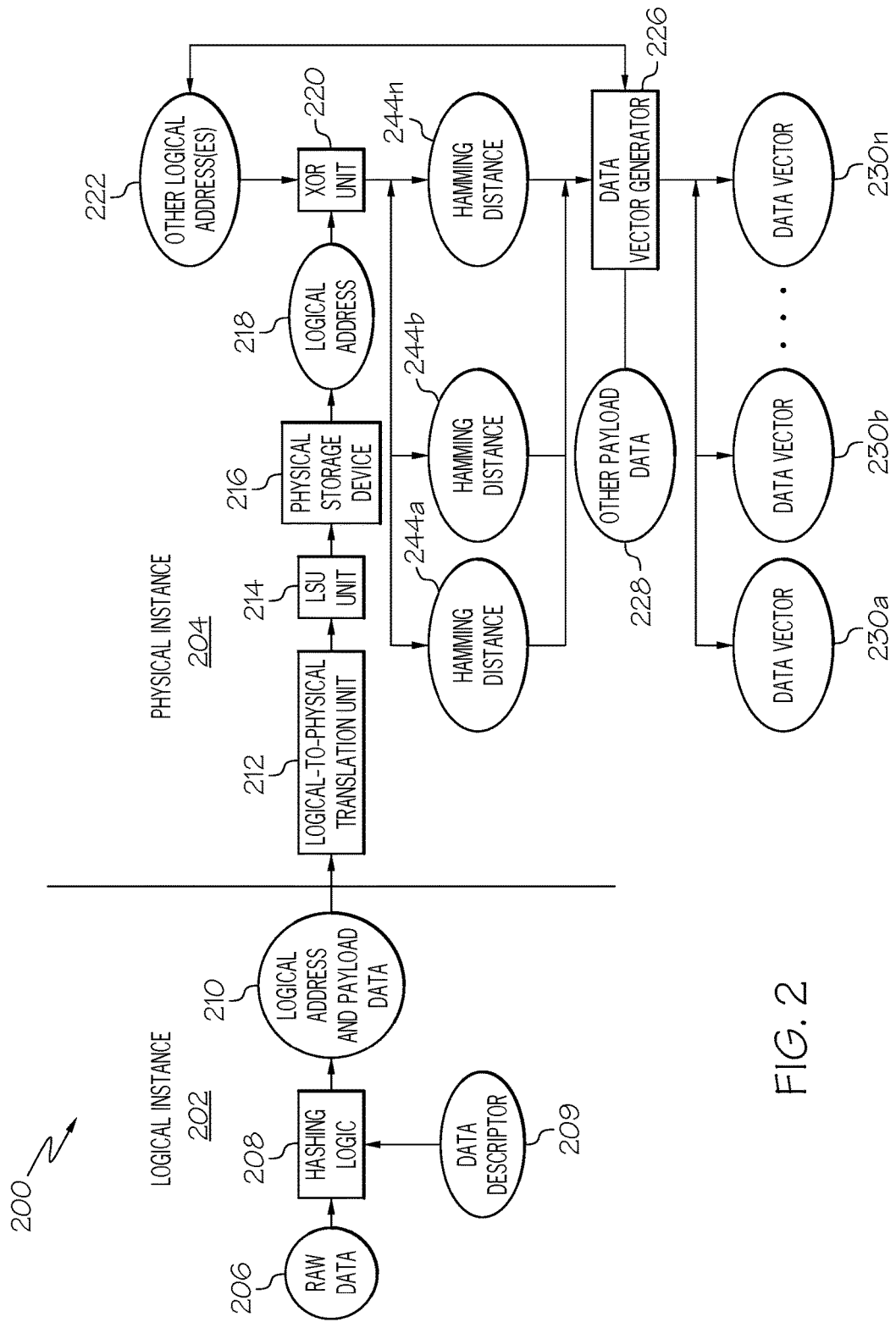
FIG. 2 illustrates an exemplary system in which sets of logical addresses are evaluated to determine their relativity, according to one embodiment of the present invention.

With reference then to FIG. 2, an exemplary system 200 in which data is hashed and retrieved through the use of Hamming distances, in accordance with one embodiment of the present invention, is presented. As depicted, system 200 comprises a logical instance 202 and a physical instance 204, in which data and addresses are depicted within circles, and processing logic is depicted within squares. The logical instance 202 includes software logic, such as hashing logic 208, which can exist purely in software, including software HDCBDGWL 148 that is running on a computer such as computer 102 shown in FIG. 1, or it may be a combination of software, firmware, and/or hardware in a cloud or other network of shared resources.

Physical instance 204 is made up primarily of hardware devices, such as elements 212, 214, 216, 220, and 226 depicted in FIG. 2. In one embodiment, all hardware elements depicted in physical instance 204 are on a single chip, which increases the speed of the processes described herein.

As depicted within logical instance 202, raw data 206 is first sent to a hashing logic 208. Note that while hashing logic 208 is shown as part of the logical instance 202, and thus is executed in software, in one embodiment hashing logic 208 is a dedicated hardware logic, which may be part of the physical instance 204.

The raw data 206 is data that is received from a data generator or a data source. For example, raw data 206 may be a physical measurement of heat, wind, radiation, etc.; or medical data such as medical laboratory values; or sales figures for a particular store; or sociological data describing a particular population; etc. Initially, the raw data 206 is merely a combination of characters (i.e., letters and/or numbers and/or other symbols). The hashing logic 208, however, receives information about the raw data from a data descriptor 209. Data descriptor 209 is data that describes the raw data 206. In one embodiment, data descriptor 209 is generated by the entity that generated the raw data 206. For example, if the raw data 206 are readings from a mass spectrometer in a laboratory, logic in the mass spectrometer includes self-awareness information, such as the type of raw data that this particular model of mass spectrometer generates, what the raw data represents, what format/scale is used for the raw data, etc. In another embodiment, data mining logic analyzes the raw data 206 to determine the nature of the raw data 206. For example, data mining and/or data analysis logic may examine the format of the data, the time that the data was generated, the amount of fluctuation between the current raw data and other raw data that was generated within some predefined past period (e.g., within the past 30 seconds), the format/scale of the raw data (e.g., miles per hour), and ultimately determine that the raw data is describing wind speed and direction from an electronic weather vane.

However the data descriptor 209 is derived, its purpose is to provide meaningful context to the raw data. For example, the raw data 206 may be "90". The data descriptor 209 may be "wind speed". Thus, the context of the raw data 206 is now "hurricane strength wind".

The hashing logic 208 utilizes the data descriptor 209 to generate a logical address at which the payload data from the raw data 206 will be stored. That is, using the data descriptor 209, the hashing logic generates a meaningful logical address that, in and of itself, describes the nature of the payload data (i.e., the raw data 206). For example, the logical address "01010101" may be reserved for hurricane strength wind readings. Thus, any data stored at an address that has "01010101" at some predefined position within the logical address (which may or may not be at the beginning of the logical address) is identified as being related to "hurricane strength wind readings".

As shown in FIG. 2, the logical address and payload data 210 are then sent to a logical-to-physical translation unit 212, which is hardware that translates logical addresses into physical addresses within available physical storage, such as random access memory (RAM), solid state drive (SSD) flash memory, hard disk drives, etc. This translation can be performed through the use of a lookup table, a physical address generator, or any other process known to those skilled in the art for generating physical addresses from logical addresses. (Note that a "logical address" is defined as an address at which a storage element appears to reside from the perspective of executing software, even though the "real" memory location in a physical device may be different.) The generated physical address (which was generated by the logical-to-physical translation unit 212), the logical address 218 (which was generated by the hashing logic 208), and the payload data (e.g., raw data 206) are all then sent to a load/store unit (LSU) 214, which stores the logical address 218 and the payload data in a physical storage device 216 at the generated physical address.

The logical address 218 is then sent to an exclusive OR (XOR) unit 220. XOR unit 220 is hardware logic that compares two vectors (i.e., strings of characters), and then presents a total count of how many bits at particular bit locations are different. For example, (0101) XOR (1010)=4, since the bit in each of the four bit locations is different. Similarly, (0101) XOR (0111)=1, since only the bit at the third bit location in the two vectors is different. These generated values (i.e., 4, 1) are known as "Hamming distances", which is defined as the total number of bit differences for all of the bit locations in a vector. Thus, the Hamming distance from "0101" to "1010" is 4; the Hamming distance from "0101" to "0111" is 1; the Hamming distance from "0101" to "0010" is 3; etc. Note that it is not the total number of "1"s or "0"s that is counted. Rather, it is the total number of different bits at the same bit location within the vector that is counted. That is, "0101" and "1010" have the same number of "1"s (2), but the Hamming distance between these two vectors is 4, as explained above.

XOR unit 220 then compares the logical address 218 (which was generated for the raw data 206 as just described) with an other logical address 222, in order to generate the Hamming distance 224 between these two logical addresses. That is, the logical address of a baseline data (e.g., the logical address that was generated for raw data 206) is compared to the logical address of another data in order to generate the Hamming distance between their respective logical addresses. For example, assume that raw data 206 is data that describes snow. Thus, a logical address (e.g., "S") is generated for raw data 206 that identifies this data as being related to snow. Another logical address 222 (e.g., "R") is then generated for data related to rain, and another logical address (e.g., "F") is generated for data related to fog. The Hamming distances between "S" and "R" and "F" are then used to determine how closely related these various data are to one another.

Thus, in FIG. 2, three exemplary Hamming distances 224a-n are depicted, where each of the Hamming distances describes how "different" the logical address for another data set is as compared to the logical address for a base data. That is, assume that the logical address 218 is the logical address for data related to snow. Assume further that another of the other logical addresses 222 is for rain, while another of the logical addresses 222 is for fog. By comparing these other logical addresses 222 for rain and fog to the logical address 218 for snow, their respective Hamming distances 244a-244b are generated by the XOR unit 220.

These Hamming distances 224a-224b are then combined with the logical address (e.g., other logical addresses 222) and the data itself (e.g., other payload data 228) and sent to a data vector generator 226 in order to create one or more data vectors 230a-n. Additional detail of data vector 230a is shown in FIG. 3, which includes a logical address 302 (i.e., "01010101"), the Hamming distance 304 from the logical address 302 to some predefined/predetermined base logical address, and the payload data 306.

As described in FIG. 2, two payload data are deemed to be related if their respective logical addresses are within some predetermined Hamming distance to each other. That is, the two logical addresses need not be the exact same logical address. Rather, just being "similar" is enough to associate their respective payloads together. The reason for this is due to a combination of unique properties held by logical addresses that are over a certain number of bits (e.g., between 1,000 and 10,000 bits in length) and statistical probability.

For example, consider two logical addresses that are each 1,000 bits long. Out of these 1,000 bits, only a small percentage of the bit (e.g., 4 bits out of the 1,000) are "significant bits". The term "significant bits" is defined as those bits at specific bit locations in a logical address that provide a description, such as metadata, that describes a feature of the event represented by the payload data stored at that logical address. For example, in the logical address vector 302 shown in FIG. 3, the "1" bits found in bit locations 2, 4, 6, 8 of logical address vector 302 are the "significant bits" that describe what the payload data 306 shown in the memory vector 230a in FIG. 3 represents. Thus, the other four bits in the bit locations 1, 3, 5, 7 are "insignificant", since they have nothing to do with describing the payload data 306. If the logical address vector 302 was 1,000 bits long, instead of just 8 bits long, then the 996 bits in the rest of the logical address vector would be insignificant. Thus, two logical addresses could both describe a same type of payload data, even if the Hamming distance between them was very large.

In order to filter out logical addresses that are unrelated, different approaches can be used. One approach is to simply mask in only those addresses that contain the "significant bits". This allows a precise collection of related data, but is relatively slow.

Another approach to determining which logical addresses are actually related is to develop a cutoff value for the Hamming distance based on historical experience. That is, this cutoff value is a maximum Hamming distance that, if exceeded, indicates that a difference in the type of two data payload objects exceeds some predetermined limit. This historical experience is used to examine past collections of data, from which the Hamming distance between every pair of logical addresses (which were generated by the hashing logic 208 shown in FIG. 2) is used to determine where the "break point" (i.e., the "cutoff value") is. For example, assume that this historical analysis shows that logical address pairs (who use 1,000 bit addresses) that are within a Hamming distance of 10 contain the same type of data 99.99% of the time; logical address pairs that are within a Hamming distance of 50 contain the same type of data 95% of the time; and logical address pairs that are within a Hamming distance of 500 contain the same type of data 80% of the time. Based on the level of precision required, the appropriate Hamming distance is then selected for future data collection/association.

Once the cutoff value for the Hamming distance between two logical addresses is determined (using statistics, historical experience, etc.), the probability that two logical addresses are actually related can be fine-tuned using a Bayesian probability formula. For example, assume that A represents the event that two logical addresses both contain the same significant bits that describe a same attribute of payload data stored at the two logical addresses, and B represents the event that the Hamming distance between two logical addresses is less than a predetermined number (of bit differences), as predetermined using past experience, etc. This results in the Bayesian probability formula of:

$$P(A \mid B) = \frac{P(B \mid A)P(A)}{P(B)}$$

where:
P(A|B) is the probability that two logical addresses both contain the same significant bits that describe a same attribute of payload data stored at the two logical addresses (A) given that (|) the Hamming distance between two logical addresses is less than a predetermined number (B);
P(B|A) is the probability that the Hamming distance between two logical addresses is less than a predetermined number given that (|) the two logical addresses both contain the same significant bits that describe a same attribute of payload data stored at the two logical addresses;

P(A) is the probability that two logical addresses both contain the same significant bits that describe a same attribute of payload data stored at the two logical addresses regardless of any other information; and P(B) is the probability that the Hamming distance between two logical addresses is less than a predetermined number regardless of any other information.

For example, assume that either brute force number crunching (i.e., examining thousands/millions of logical addresses) and/or statistical analysis (e.g., using a cumulative distribution formula, a continuous distribution formula, a stochastic distribution statistical formula, etc.) has revealed that there is a 95% probability that two logical addresses that are less than 500 Hamming bits apart will contain the same significant bits (i.e., (P(B|A)=0.95). Assume also that similar brute force number crunching and/or statistical analysis reveals that in a large sample, there is a 99.99% probability that at least two logical addresses will both contain the same significant bits regardless of any other information (i.e., P(A)=0.9999). Finally, assume that similar brute force number crunching and/or statistical analysis reveals that two particular logical addresses are less than 500 bits apart regardless of any other information (i.e., P(B)=0.98). In this scenario, the probability that two logical addresses both contain the same significant bits, which describe a same attribute of payload data stored at the two logical addresses given that that the Hamming distance between two logical addresses is less than a predetermined number (i.e., P(A|B)) is 97%:

$$P(A \mid B) = \frac{.95 * .9999}{.98} = .97$$

However, assume now that such brute force number crunching and/or statistical analysis reveals that there is only an 80% probability that two logical addresses that are less than 500 Hamming bits apart will contain the same significant bits (i.e., (P(B|A)=0.80). Assuming all other values remain the same (i.e., P(A)=0.9999 and P(B)=0.98), then probability that two logical addresses both contain the same significant bits, which describe a same attribute of payload data stored at the two logical addresses given that that the Hamming distance between two logical addresses is less than a predetermined number (i.e., P(A|B)), is now 81%:

$$P(A \mid B) = \frac{.80 * .9999}{.98} = .81$$

Note the following features of this analysis. First, due to the large number of data entries (i.e., thousands or millions or more), use cases and/or statistical analyses show that the probability that two logical addresses will both contain the same significant bits is high (e.g., 99.99%). Second, due to random matching (i.e., two bits randomly matching) combined with controlled matching (i.e., two bits match since they both describe a same attribute of the payload data), the probability that any two logical addresses are less than 500 bits apart is also high (e.g., 98%). However, because of these factors, P(A) is higher than P(B); thus P(A|B) will be higher than P(B|A).

With reference now to FIG. 4, one or more of the data vectors 230a-230n (depicted in FIG. 2, and represented as data vectors 410 in FIG. 4) are then sent to a context-based data gravity wells membrane 412. The context-based data gravity wells membrane 412 is a virtual mathematical membrane that is capable of supporting multiple context-based data gravity wells. That is, the context-based data gravity wells membrane 412 is a mathematical framework that is part of a program such as HDCBDGWL 148 shown in FIG. 1. This mathematical framework is able to 1) provide a virtual environment in which the multiple context-based data gravity wells exist; 2) populate the multiple context-based data gravity wells with appropriate synthetic context-based objects (e.g., those synthetic context-based objects having non-contextual data objects, context objects, and Hamming distances that match those found in the structure of a particular context-based data gravity well); and 3) support the visualization/display of the context-based data gravity wells on a display.

For example, in the example shown in FIG. 4, data vectors 410 are selectively pulled into context-based data gravity well frameworks in order to define context-based data gravity wells. In one embodiment, this selective pulling is performed by software logic (e.g., HDCBDGWL 148 depicted in FIG. 1). In another embodiment, however, this selective pulling is performed by hardware logic, that routes data vectors (e.g., the Hi/Lo signals derived from the bits in the data vectors) into hardware data gravity wells (e.g., summation logic, which is hardware that simply sums/adds how many data vectors/objects are pulled into the hardware data gravity well), thus acting as a hardware data vector sorter.

Context-based data gravity wells membrane 412 supports multiple context-based data gravity well frameworks. For example, consider context-based data gravity well framework 402. A context-based data gravity well framework is defined as a construct that includes the capability of pulling data objects from a streaming data flow, such as data vectors 410, and storing same if a particular parsed synthetic context-based object contains a particular Hamming distance 403a and/or particular non-contextual data object 404a and/or a particular context object 412a (where non-contextual data object 404a and context object 412a and Hamming distance 403a are defined herein). Note that context-based data gravity well framework 402 is not yet populated with any data vectors, and thus is not yet a context-based data gravity well. However, context-based data gravity well framework 406 is populated with data vectors 408, and thus has been transformed into a context-based data gravity well 410. This transformation occurred when context-based data gravity well framework 406, which contains (i.e., logically includes and/or points to) a non-contextual data object 404b and/or a context object 412b and/or Hamming distances 403b-403c, all (or at least a predetermined percentage) of which are part of each of the synthetic context-based objects 408 (e.g., data vectors that, when parsed into their components form parsed synthetic context-based objects 414a), are populated with one or more parsed synthetic context-based objects. That is, parsed synthetic context-based object 414a is an object that has been parsed (split up) to reveal 1) a particular Hamming distance from a logical address in a particular data vector to a logical address of some predefined/predetermined base data vector, 2) a particular non-contextual data object, and/or 3) a particular context object.

Figure 5:
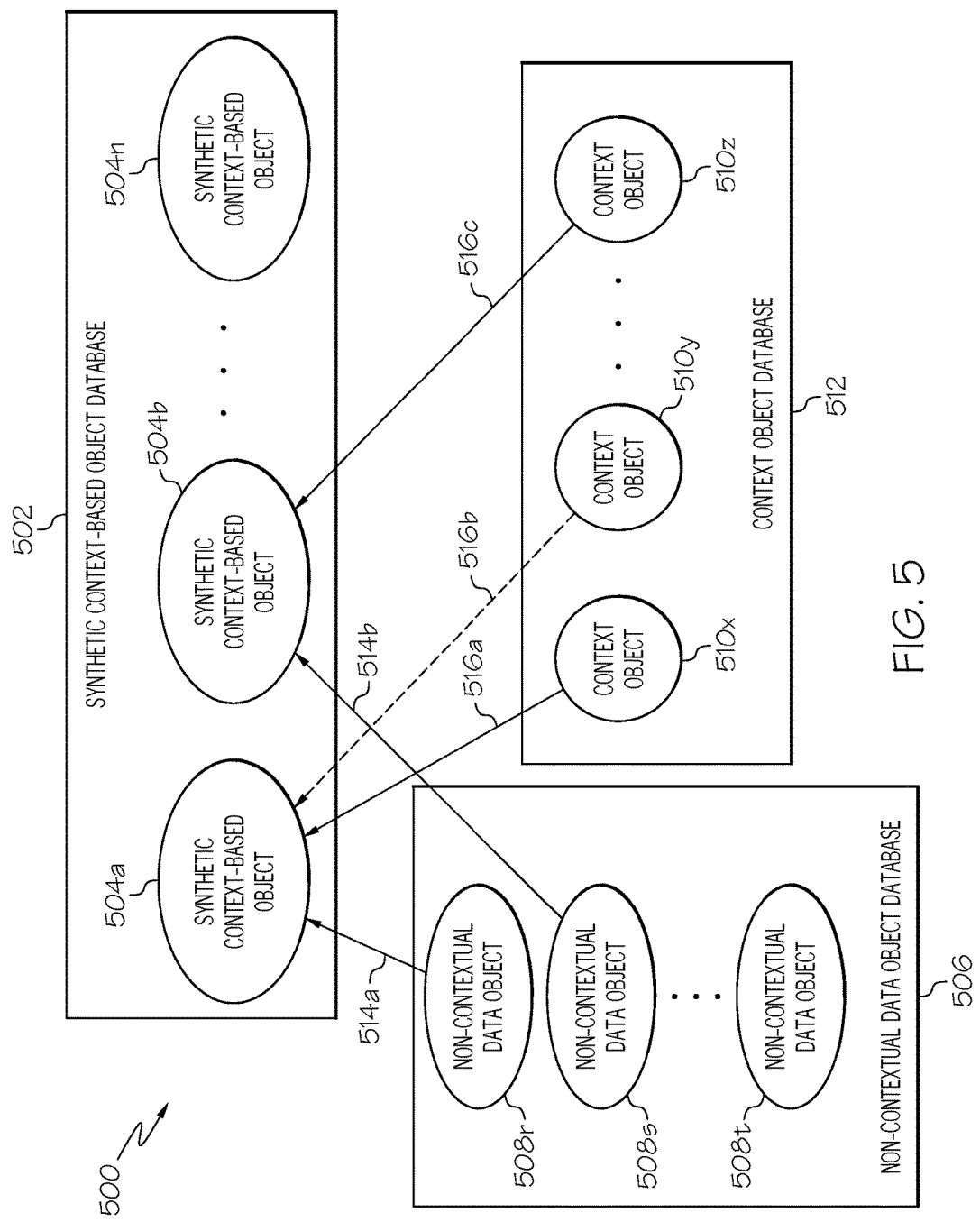
FIG. 5 illustrates a process for generating one or more synthetic context-based objects.

In order to understand what is meant by non-contextual data objects and context objects, reference is now made to FIG. 5, which depicts a process for generating one or more synthetic context-based objects in a system 500. Note that system 500 is a processing and storage logic found in computer 102 and/or data storage system 152 shown in FIG.

1, which process, support, and/or contain the databases, pointers, and objects depicted in FIG. 5.

Within system 500 is a synthetic context-based object database 502, which contains multiple synthetic context-based objects 504a-504n (thus indicating an "n" quantity of objects, where "n" is an integer). Each of the synthetic context-based objects 504a-504n is defined by at least one non-contextual data object and at least one context object. That is, at least one non-contextual data object is associated with at least one context object to define one or more of the synthetic context-based objects 504a-504n. The non-contextual data object ambiguously relates to multiple subject-matters, and the context object provides a context that identifies a specific subject-matter, from the multiple subject-matters, of the non-contextual data object.

Note that the non-contextual data objects contain data that has no meaning in and of itself. That is, the data in the context objects are not merely attributes or descriptors of the data/objects described by the non-contextual data objects. Rather, the context objects provide additional information about the non-contextual data objects in order to give these non-contextual data objects meaning. Thus, the context objects do not merely describe something, but rather they define what something is. Without the context objects, the non-contextual data objects contain data that is meaningless; with the context objects, the non-contextual data objects become meaningful.

For example, assume that a non-contextual data object database 506 includes multiple non-contextual data objects 508r-508t (thus indicating a "t" quantity of objects, where "t" is an integer). However, data within each of these non-contextual data objects 508r-508t by itself is ambiguous, since it has no context. That is, the data within each of the non-contextual data objects 508r-508t is data that, standing alone, has no meaning, and thus is ambiguous with regards to its subject-matter. In order to give the data within each of the non-contextual data objects 508r-508t meaning, they are given context, which is provided by data contained within one or more of the context objects 510x-510z (thus indicating a "z" quantity of objects, where "z" is an integer) stored within a context object database 512. For example, if a pointer 514a points the non-contextual data object 508r to the synthetic context-based object 504a, while a pointer 516a points the context object 510x to the synthetic context-based object 504a, thus associating the non-contextual data object 508r and the context object 510x with the synthetic context-based object 504a (e.g., storing or otherwise associating the data within the non-contextual data object 508r and the context object 510x in the synthetic context-based object 504a), the data within the non-contextual data object 508r now has been given unambiguous meaning by the data within the context object 510x. This contextual meaning is thus stored within (or otherwise associated with) the synthetic context-based object 504a.

Similarly, if a pointer 514b associates data within the non-contextual data object 508s with the synthetic context-based object 504b, while the pointer 516c associates data within the context object 510z with the synthetic context-based object 504b, then the data within the non-contextual data object 508s is now given meaning by the data in the context object 510z. This contextual meaning is thus stored within (or otherwise associated with) the synthetic context-based object 504b.

Note that more than one context object can give meaning to a particular non-contextual data object. For example, both context object 510x and context object 510y can point to the synthetic context-based object 504a, thus providing compound context meaning to the non-contextual data object 508r shown in FIG. 5. This compound context meaning provides various layers of context to the data in the non-contextual data object 508r.

Note also that while the pointers 514a-514b and 516a-516c are logically shown pointing toward one or more of the synthetic context-based objects 504a-504n, in one embodiment the synthetic context-based objects 504a-504n actually point to the non-contextual data objects 508r-508t and the context objects 510x-510z. That is, in one embodiment the synthetic context-based objects 504a-504n locate the non-contextual data objects 508r-508t and the context objects 510x-510z through the use of the pointers 514a-514b and 516a-516c.

Figure 6:
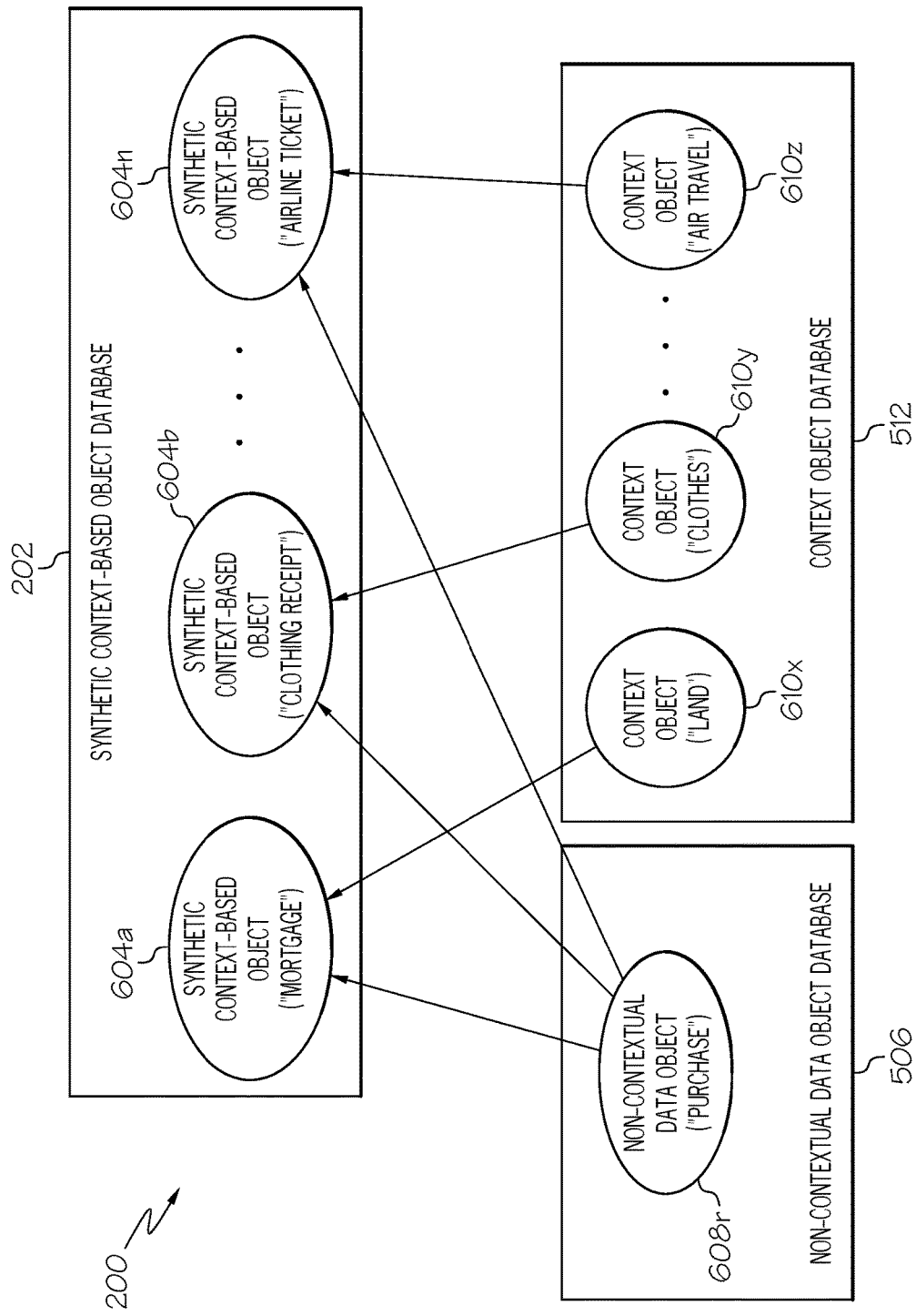
FIG. 6 depicts an exemplary case in which synthetic context-based objects are defined for the non-contextual data object datum "Purchase"

Consider now an exemplary case depicted in FIG. 6, in which synthetic context-based objects are defined for the non-contextual datum object "purchase". Standing alone, without any context, the word "purchase" is meaningless, since it is ambiguous and does not provide a reference to any particular subject-matter. That is, "purchase" may refer to a financial transaction, or it may refer to moving an item using mechanical means. Furthermore, within the context of a financial transaction, "purchase" has specific meanings. That is, if the purchase is for real property (e.g., "land"), then a mortgage company may use the term to describe a deed of trust associated with a mortgage, while a title company may use the term to describe an ownership transfer to the purchaser. Thus, each of these references is within the context of a different subject-matter (e.g., mortgages, ownership transfer, etc.).

In the example shown in FIG. 6, then, data (i.e., the word "purchase") from the non-contextual data object 608r is associated with (e.g., stored in or associated by a look-up table, etc.) a synthetic context-based object 604a, which is devoted to the subject-matter "mortgage". The data/word "purchase" from non-contextual data object 608r is also associated with a synthetic context-based object 604b, which is devoted to the subject-matter "clothing receipt". Similarly, the data/word "purchase" from non-contextual data object 608r is also associated with a synthetic context-based object 604n, which is devoted to the subject-matter "airline ticket".

In order to give contextual meaning to the word "purchase" (i.e., define the term "purchase") in the context of "land", context object 610x, which contains the context datum "land", is associated with (e.g., stored in or associated by a look-up table, etc.) the synthetic context-based object 604a. Associated with the synthetic context-based object 604b is a context object 610y, which provides the context/datum of "clothes" to the term "purchase" provided by the non-contextual data object 608r. Thus, the synthetic context-based object 604b defines "purchase" as that which is related to the subject-matter "clothing receipt", including electronic, e-mail, and paper evidence of a clothing sale. Associated with the synthetic context-based object 604n is a context object 610z, which provides the context/datum of "air travel" to the term "purchase" provided by the non-contextual data object 608r. Thus, the synthetic context-based object 604n defines "purchase" as that which is related to the subject-matter "airline ticket", including electronic, e-mail, and paper evidence of a person's right to board a particular airline flight.

In one embodiment, the data within a non-contextual data object is even more meaningless if it is merely a combination of numbers and/or letters. For example, consider the scenario in which data "10" were to be contained within a non-contextual data object 608r depicted in FIG. 6. Standing alone, without any context, this number is meaningless, identifying no particular subject-matter, and thus is completely ambiguous. That is, "10" may relate to many subject-matters. However, when associated with context objects that define certain types of businesses, then "10" is inferred (using associative logic such as that found in HDCBDGWL 148 shown in FIG. 1) to relate to acreage when associated with context object 610x, to a clothing size when associated with context object 610y, and to thousands of air miles (credits given by an airline to be used in future ticket purchases) when associated with context object 610z. That is, the data "10" is so vague/meaningless without the associated context object that the data does not even identify the units that the term describes, much less the context of these units.

Referring back again now to FIG. 4. note that the data vectors 410, which may be parsed synthetic context-based objects 414a-414c (e.g., data objects that include the Hamming distance of the logical address to the logical address of a base/reference data object, non-contextual data objects, and/or context objects) are streaming in real-time from a data source across the context-based data gravity wells membrane 412. If a particular parsed synthetic context-based object is never pulled into any of the context-based data gravity wells on the context-based data gravity wells membrane 412, then that particular parsed synthetic context-based object is trapped in an unmatched object trap 422. In one embodiment, only those parsed synthetic context-based objects that do not have a Hamming distance found in any of the context-based data gravity wells are trapped in the unmatched object trap 422, while those parsed synthetic context-based objects that are missing a context object simply continue to stream to another destination and/or another data gravity wells membrane.

Consider now context-based data gravity well 416. Note that context-based data gravity well 416 includes two context objects 412c-412d and a non-contextual data object 404c and a single Hamming distance (object) 403d. The presence of context objects 412c-412d (which in one embodiment are graphically depicted on the walls of the context-based data gravity well 416) and non-contextual data object 404c and Hamming distance 403d within context-based data gravity well 416 causes synthetic context-based objects such as parsed synthetic context-based object 414b to be pulled into context-based data gravity well 416. Note further that context-based data gravity well 416 is depicted as being larger than context-based data gravity well 410, since there are more synthetic context-based objects (418) in context-based data gravity well 416 than there are in context-based data gravity well 410.

Note that, in one embodiment, the context-based data gravity wells depicted in FIG. 4 can be viewed as context relationship density wells. That is, the context-based data gravity wells have a certain density of objects, which is due to a combination of how many objects have been pulled into a particular well as well as the weighting assigned to the objects, as described herein.

Note that in one embodiment, it is the quantity of synthetic context-based objects that have been pulled into a particular context-based data gravity well that determines the size and shape of that particular context-based data gravity well. That is, the fact that context-based data gravity well 416 has two context objects 412c-412d while context-based data gravity well 410 has only one context object 412b has no bearing on the size of context-based data gravity well 416. Rather, the size and shape of context-based data gravity well 416 in this embodiment is based solely on the quantity of synthetic context-based objects such as parsed synthetic context-based object 414b (each of which contain a Hamming distance 403d from its logical address to the logical address of a base data object, a non-contextual data object 404c and/or context objects 412c-412d) that are pulled into context-based data gravity well 416. For example, context-based data gravity well 420 has a single non-contextual data object 404d and a single context object 412e, just as context-based data gravity well 410 has a single non-contextual data object 404b and a single context object 412b. However, because context-based data gravity well 420 is populated with only one parsed synthetic context-based object 414c, it is smaller than context-based data gravity well 410, which is populated with four synthetic context-based objects 408 (e.g., four instances of the parsed synthetic context-based object 414a).

In one embodiment, the context-based data gravity well frameworks and/or context-based data gravity wells described in FIG. 4 are graphical representations of 1) sorting logic and 2) data storage logic that is part of HDCBDGWL 148 shown in FIG. 1. That is, the context-based data gravity well frameworks define the criteria that are used to pull a particular parsed synthetic context-based object into a particular context-based data gravity well, while the context-based data gravity wells depict the quantity of parsed synthetic context-based objects that have been pulled into a particular context-based data gravity well. Note that in one embodiment, the original object from the stream of parsed synthetic context-based objects (which are derived from data vectors 410) goes into an appropriate context-based data gravity well, with no copy of the original being made. In another embodiment, a copy of the original object from the stream of parsed synthetic context-based objects 410 goes into an appropriate context-based data gravity well, while the original object continues to its original destination (e.g., a server that keeps a database of inventory of items at a particular store). In another embodiment, the original object from the stream of parsed synthetic context-based objects 410 goes into an appropriate context-based data gravity well, while the copy of the original object continues to its original destination (e.g., a server that keeps a database of inventory of items at a particular store).

Thus, as depicted and described in FIG. 4, data vectors, which include a Hamming distance from the logical address for that data vector to a predefined/predetermined logical address for other data, are pulled into particular data gravity wells according to which Hamming distances are attracted to such data gravity wells. As described also in FIG. 4, this attraction may also be based on a context object and/or a non-contextual data object associated with that data vector. In one embodiment, a context object 308 and/or a non-contextual data object 310 may be part of a particular data vector (e.g., data vector 230a shown in FIG. 3). Parsing logic (e.g., part of HDCBDGWL 148 shown in FIG. 1) is able to parse out the Hamming distance 304, the context object 308, and/or the non-contextual data object 310 from the data vector 230a, in order to determine which data gravity well will attract that particular data vector 230a.

Figure 7:
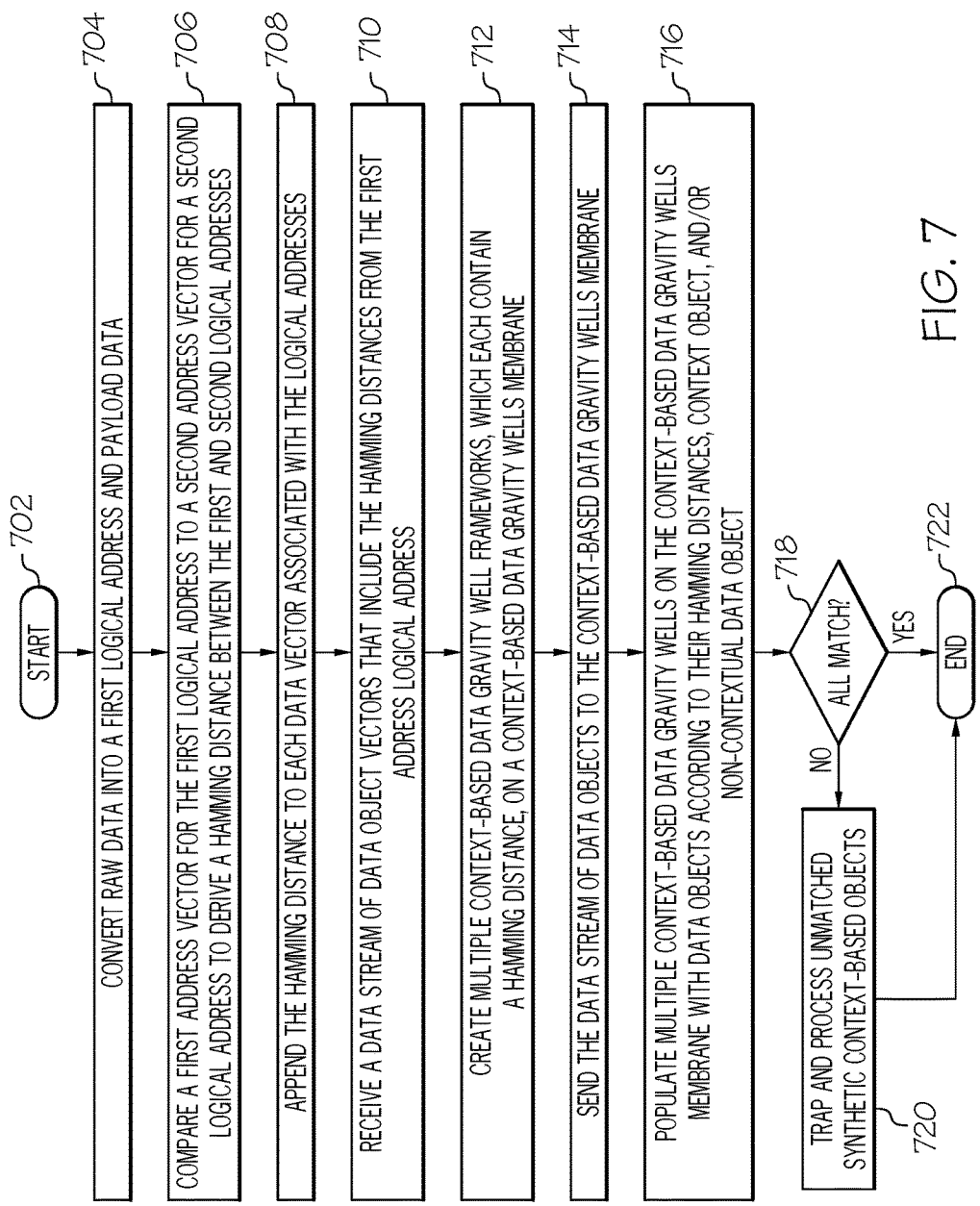
FIG. 7 is a high-level flow chart of one or more steps performed by a processor to define multiple context-based data gravity wells on a context-based data gravity wells membrane based on Hamming distances, context objects, and/or non-contextual data objects.

With reference now to FIG. 7, a high-level flow chart of one or more steps performed by one or more processors to retrieve and analyze stored data, according to one embodiment of the present invention, is presented. After initiator block 702, a hashing logic converts raw data into a first logical address and payload data (block 704). As described herein, the first logical address describes metadata about the payload data stored at that address. That is, the metadata (i.e., data about data) describes what the payload data context is, where it came from, what it describes, when it was generated, etc.

As described in block 706, a hardware exclusive OR (XOR) unit then compares a first address vector (i.e., a string of characters used as an address) for the first logical address to a second address vector for a second logical address to derive a Hamming distance between the two logical addresses. This comparison enables a determination of how similar two data are to one another based on how similar their logical addresses (created at block 704) are to one another. Note that, in one embodiment, this Hamming distance between the first logical address (of a base predefined data object) and the second logical address (or another data object) is derived by a hardware XOR unit.

As described in block 708, the Hamming distance from the logical address of each data object to the logical address of the predefined/predetermined base object is appended to each data vector for each data object.

As described in block 710, and illustrated in FIG. 4, a data stream of data object vectors (which include the afore-described Hamming distances and/or context objects and/or non-contextual data objects) is received. As described in block 712, a context-based data gravity wells membrane supporting multiple context-based data gravity well frameworks is created. As described in block 714, the received data stream of data vectors (e.g., "data object vectors"/"data vector objects") is then sent to the context-based data gravity wells membrane, where they populate the data gravity wells (block 716).

As depicted in query block 718, if all of the data objects are pulled into one of the data gravity wells, the process ends (terminator block 722). Otherwise, those data objects that are not pulled into any of the data gravity wells on the data gravity wells membrane are trapped (block 720), thus prompting an alert describing which data objects were not pulled into any of the data gravity wells on that data gravity wells membrane. In this scenario, the untrapped data objects may be sent to another gravity wells membrane that has other data gravity wells.

Note that in one embodiment, a processor calculates a virtual mass of each of the parsed synthetic context-based objects. In one embodiment, the virtual mass of the parsed synthetic context-based object is derived from a formula $(P(C)+P(S))\times Wt(S)$, where $P(C)$ is the probability that the non-contextual data object has been associated with the correct context object, $P(S)$ is the probability that the Hamming distance has been associated with the correct synthetic context-based object, and $Wt(S)$ is the weighting factor of importance of the synthetic context-based object. As described herein, in one embodiment the weighting factor of importance of the synthetic context-based object is based on how important the synthetic context-based object is to a particular project.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to convert raw data into a first logical address and first payload data, wherein the first logical address describes metadata about the first payload data;

program instructions to compare the first logical address to a second logical address to derive a Hamming distance between the first and second logical addresses, wherein the second logical address is for a second payload data;

program instructions to create a data vector for the second payload data, wherein the data vector comprises the Hamming distance between the first and second logical addresses;

program instructions to sort data vectors into specific data gravity wells on a data gravity wells membrane according to the Hamming distance stored in the data vector, wherein the data gravity wells membrane is a mathematical framework that 1) performs to provide a virtual environment in which multiple context-based data gravity wells exist; 2) populates the multiple context-based data gravity wells with synthetic context-based objects; and 3) performs to display the multiple context-based data gravity wells on a display;

program instructions to apply a context object to a non-contextual data object, wherein the non-contextual data object is a component of the raw data, wherein the non-contextual data object ambiguously relates to multiple subject-matters, and wherein the context object provides a context that identifies a specific subject-matter, from the multiple subject-matters, of the non-contextual data object;

program instructions to incorporate the context object and the non-contextual data object into the data vector for the second payload data;

program instructions to sort the second payload data into specific data gravity wells on the data gravity wells membrane according to the context objects and the non-contextual data objects; and program instructions to display the second payload data being sorted into the specific data gravity wells on the display.

2. The computer system of claim 1, wherein the first and second payload data quantitatively describe a commercial transaction.

3. The computer system of claim 1, wherein the first and second payload data qualitatively describe a commercial transaction.

4. The computer system of claim 1, wherein the first and second payload data qualitatively describe an entity.

5. The computer system of claim 1, wherein the hashing logic comprises one or more processors executing the instructions to convert the raw data into the first logical address and first payload data.

6. The computer system of claim 1, further comprising:
program instructions to calculate a virtual mass of a parsed synthetic context-based object, wherein the parsed synthetic context-based object comprises the context object, the non-contextual data object, and the Hamming distance, and wherein the virtual mass of the parsed synthetic context-based object is derived from a formula of:

$$(P(C)+P(S))\times Wt(S),$$

where P(C) is the probability that the non-contextual data object has been associated with the correct context object, wherein P(S) is the probability that the Hamming distance has been associated with the correct parsed synthetic context-based object, and where Wt(S) is the weighting factor of importance of the parsed synthetic context-based object.

7. The computer system of claim 1, further comprising:
program instructions to determine which logical addresses describe a same type of data according to a cutoff value for the Hamming distance based on historical experience, wherein the cutoff value is a maximum Hamming distance that describes a predetermined level of probability that two logical addresses describe a same type of data payload; and program instructions to fine tune a probability that the two logical addresses describe the same type of payload data using a Bayesian probability formula, where A represents an event that two logical addresses both contain same significant bits that describe a same attribute of payload data stored at the two logical addresses, where B represents an event that the Hamming distance between two logical addresses is less than a predetermined number of bit differences, and wherein the Bayesian probability formula is:

$$P(A|B) = \frac{P(B|A)P(A)}{P(B)}$$

where:
P(A|B) is a probability that two logical addresses both contain the same significant bits that describe the same attribute of payload data stored at the two logical addresses (A) given that (I) the Hamming distance between two logical addresses is less than a predetermined number (B);

P(B|A) is a probability that the Hamming distance between two logical addresses is less than a predetermined number given that (I) the two logical addresses both contain the same significant bits that describe the same attribute of payload data stored at the two logical addresses;

P(A) is a probability that two logical addresses both contain the same significant bits that describe the same attribute of payload data stored at the two logical addresses regardless of any other information; and P(B) is a probability that the Hamming distance between the two logical addresses is less than a predetermined number regardless of any other information.

8. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:

program instructions to convert raw data into a first logical address and first payload data, wherein the first logical address describes metadata about the first payload data;

program instructions to compare the first logical address to a second logical address to derive a Hamming distance between the first and second logical addresses, wherein the second logical address is for a second payload data;

program instructions to create a data vector for the second payload data, wherein the data vector comprises the Hamming distance between the first and second logical addresses;

program instructions to sort data vectors into specific data gravity wells on a data gravity wells membrane according to the Hamming distance stored in the data vector, wherein the data gravity wells membrane is a mathematical framework that 1) performs to provide a virtual environment in which multiple context-based data gravity wells exist; 2) populates the multiple context-based data gravity wells with synthetic context-based objects; and 3) performs to display the multiple context-based data gravity wells on a display;

program instructions to apply a context object to a non-contextual data object, wherein the non-contextual data object is a component of the raw data, wherein the non-contextual data object ambiguously relates to multiple subject-matters, and wherein the context object provides a context that identifies a specific subject-matter, from the multiple subject-matters, of the non-contextual data object;

program instructions to incorporate the context object and the non-contextual data object into the data vector for the second payload data; and program instructions to sort the second payload data into specific data gravity wells on the data gravity wells membrane according to the context objects and the non-contextual data objects.

* * * * *